Feb. 27, 1951     F. C. P. HENROTEAU ET AL     2,543,019

LENS DISSOLUTION METHOD AND APPARATUS

Filed Nov. 11, 1944

INVENTORS
FRANCOIS C. P. HENROTEAU
SANFORD S. ULRICH

BY

ATTORNEY

UNITED STATES PATENT OFFICE 2,543,019

LENS DISSOLUTION METHOD AND APPARATUS

François C. P. Henroteau and Sanford S. Ulrich, Fort Wayne, Ind., assignors, by mesne assignments, to Farnsworth Research Corporation, a corporation of Indiana Application November 11, 1944, Serial No. 563,057

15 Claims. (Cl. 41—9)

This invention relates generally to a method and apparatus for manufacturing lenses and more particularly to a method and apparatus for forming lenses of materials which are soluble in water or other substances.

It is conventional to utilize salt crystals and other types of crystals as optical lenses. Crystals have very desirable optical characteristics such, for example, as low light dispersion in the visible portion of the spectrum and substantially perfect transparency to light waves within the entire visible spectrum from infrared wavelengths of 10 microns to ultra-violet wavelengths of $\frac{1}{10}$ micron. The refractive index of a given crystal is always a fixed quantity by reason of the fact that once the crystal is formed its refractive index cannot change. The structure of crystals is perfectly homogeneous, without flaws or striae.

Despite the fact that salt crystals have such desirable optical characteristics, they have not been used extensively because of difficulties which arise in the formation of a crystal into a lens. Mechanical grinding processes require great care to prevent chipping or fracture of a crystal. This is due to the fact that by its very nature a salt crystal is extremely brittle and subject to breakage or chipping when subjected to even a slight mechanical shock. It is known to the prior art to form lenses of salt crystals by dissolution. However, prior art methods of dissolution comprise the very tedious and inaccurate method of wiping the crystal surface with a solvent-soaked wiping material such as cloth. While crystals can be formed in this manner, it is substantially impossible to obtain real accuracy of curvature because the method is a trial-and-error method and not a precision method.

Accordingly, it is the principal object of this invention to provide a novel precision method and apparatus for forming optical lenses of soluble materials.

Another object of this invention is to provide a precision method of forming lenses of soluble crystals by a controlled process of dissolution.

Still another object of this invention is to provide precision apparatus for dissolving soluble crystals to obtain a predetermined form of lens.

In accordance with this invention, there is provided a method and apparatus for controlling the dissolution of a soluble lens material to obtain a lens having a predetermined curvature. There is provided a mold having the negative configuration of the lens surface which it is desired to form. The mold is cooled to a temperature such that a thin film of solvent is formed on its surface. Adjacent the mold there is provided apparatus for supporting a lens blank and moving it into and out of engagement with the film of solvent on the mold. Thus the surface of a lens blank is repeatedly contacted by a thin film of solvent which dissolves a minute layer of the lens blank after each contact. Those portions of the lens blank which do not conform with the configuration of the mold are eventually removed by dissolution from the lens blank until the surface of the lens blank has the positive configuration of the mold. Between each contact of the lens blank with the film of solvent on the mold, the solvent deposited on the lens blank is allowed to remain thereon for a predetermined period after which the mold and the lens blank are swept by a high-velocity blast of gas whereby the mold surface and the lens blank surface are thoroughly cleaned between successive contacts.

For a better understanding of the invention, together with other and further objects thereof, reference is made to the following description, taken in connection with the accompanying drawings, and its scope will be pointed out in the appended claims.

Figure 1:
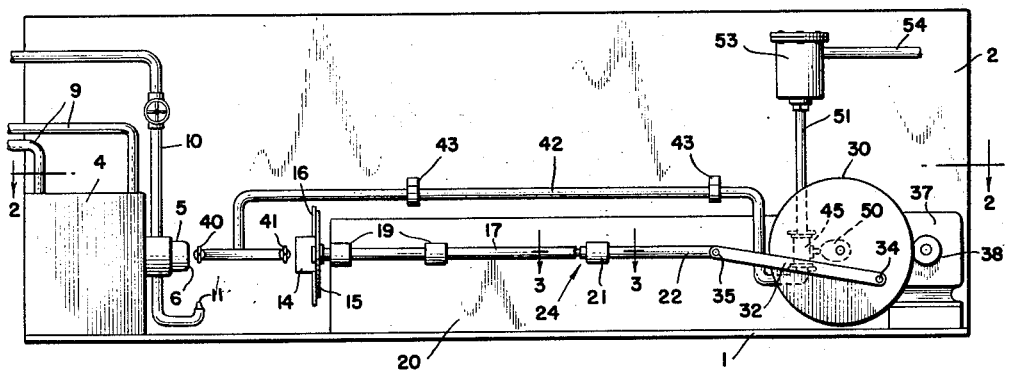
Fig. 1 is a side elevation illustrating apparatus for carrying out the invention.
Figure 4:
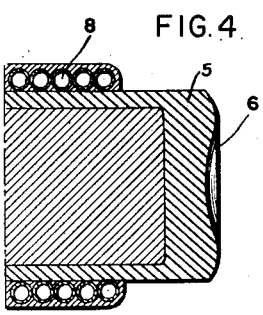
Fig. 4 is an enlarged cross-sectional view taken on line 4—4 of Fig. 2.

Referring to Fig. 1 of the drawings, there is provided a supporting structure consisting of a base plate 1 and a vertical supporting member 2. Secured to base member 1 is a mold-supporting and cooling structure 4. A mold 5, which is shown in more detail in Fig. 4, is supported in a fixed manner within the structure 4. The mold includes a surface 6 which is formed to have the negative configuration of a lens surface which it is desired to form. Surface 6 is illustrated herein as having a complex curvature, but it is to be understood that surface 6 may be formed to have any desired curvature depending upon the particular type of lens which it is intended to form. Mold 5 may be cylindrical and filled with acetone or some other fluid having a low freezing point. For cooling the liquid within the mold and thereby cooling the surface 6 of the mold, there is provided a cooling coil 8 which is connected by tubes 9 to a suitable source of refrigerant (not shown). Thus the mold may be cooled to any desired temperature for forming on surface 6 a film of moisture.

Figure 2:
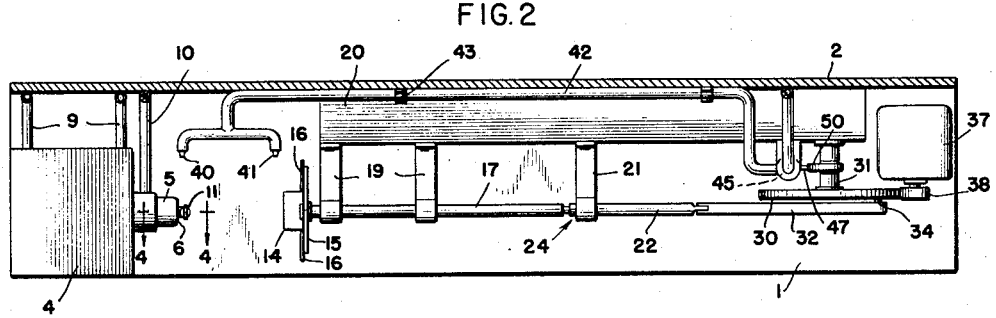
Fig. 2 is a cross section taken on line 2—2 of Fig. 1.
Figure 3:
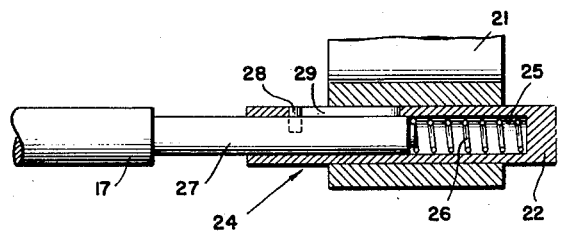
Fig. 3 is an enlarged detailed cross section taken on line 3—3 of Fig. 1.

For providing an atmosphere of moist air in the space surrounding the surface 6 of mold 5, there is provided a tube 10 which may be connected to an air-humidifying device of any well-known type (not shown). Air in this device may be under a pressure of the order of two pounds per square inch although this value is not critical, as the pressure need only be sufficient to create the most desirable rate of flow through tube 10. Tube 10 is suitably secured to supporting member 2, and the end 11 may be bent and formed, for example, as shown in Figs. 1 and 2 of the drawings, to direct a constant, low-velocity stream of humidified air toward the surface 6 of mold 5. Since the mold 5 is at a relatively low temperature, a film of moisture is formed thereon, the purpose of which will become evident later on in the description. Humidified air is specified by way of example only. Air or other gases bearing evaporated solvents are equally well adapted for use in accordance with this invention.

There is provided a lens blank 14 which may consist of a soluble material such, for example, as a crystal of sodium chloride. It is not intended that this invention shall be limited to the use of sodium chloride crystals alone, as many other crystals such, for example, as aluminum-alum, have excellent optical characteristics and are adapted to be formed in accordance with this invention. In fact, any crystal having the required optical characteristics may be formed into a lens in accordance with this invention. Lens blank 14 may be fixed to a platen 15 in any suitable manner such, for example, as by suitable clamps 16. Platen 15 is affixed to a reciprocable shaft 17 which is mounted within bearings in the studs 19. Studs 19 may be fixed as by bolts to a supporting member 20 mounted on base plate 1. Shaft 17 is connected to a second shaft 22, mounted in stud 21, by means of a lost-motion mechanism 24. This mechanism consists of a bore 25 in shaft 22 for receiving a spring member 26 and extension 27 of shaft 17. Spring 26 is normally compressed to bear on the end of extension 27 of shaft 17. For preventing relative rotation between shafts 17 and 22, there is provided a pin 28 fixed in extension 27, and a slot 29, in which pin 28 rides. The purpose of the device 24 will be explained subsequently.

For reciprocating shafts 17 and 22, there is provided a drive wheel 30 mounted on shaft 31 which is journalled in the support 20. For connecting wheel 30 with shaft 22, there is provided a connecting rod 32 pivoted to drive wheel 30 by a pin connection 34 and pivoted to rod 22 by a pin connection 35. Wheel 30 is in turn driven from an electric motor 37 through a small friction wheel 38 which frictionally engages wheel 30.

For removing moisture from the surface 6 of mold 5 and from the surface of lens blank 14, there are provided jets 40 and 41, respectively. Jet 40 is disposed adjacent the surface 6 of mold 5, and jet 41 is disposed adjacent the extreme rearward position of lens blank 14. Jets 40 and 41 are connected by tube 42, which is fixed to support 2 by brackets 43, with a valve 45. Valve 45 is of conventional construction and includes a reciprocable actuating element 47. For moving element 47 inwardly with respect to the valve to an open position, there is provided a cam 50 which is fixed to shaft 31 and rotates therewith.

Cam 50 is shaped and angularly disposed on shaft 31 to open valve 45 when the lens blank 14 is moved to the extreme rearward position illustrated in Figs. 1 and 2. Valve 45 is connected by tube 51 with a suitable air filter 53 which is provided for removing oil and other impurities from the air flowing to the jets 40 and 41. Filter 53 may be connected by a tube 54 with a source of relatively high-pressure air or other gas (not shown). Experiment proves a pressure of the order of 80 pounds per square inch to be sufficient, but this value is not critical as the pressure need only be sufficient to remove thoroughly the moisture films on surface 6 and the blank 14.

For forming a lens from a crystal, the lens blank 14 comprising a crystal of, for example, sodium chloride, is clamped to the platen 15. The lens blank 14 may have plane surfaces and be substantially rectangular in form, or the surface of the blank may be pre-formed initially to have the approximate curvature of the desired lens. As described hereinbefore, mold 5 is cooled to a relatively low temperature by the cooling coils 8 and an atmosphere of moist air is created in the space surrounding the surface 6 by directing a stream of moist air through the end 11 in tube 10. Thus there is provided a film of moisture on the surface 6 of mold 5, the thickness of which is controllable by controlling the temperature of mold 5 and the temperature and humidity of the air flowing out of tube 10. The thickness of the moisture film is also controllable by the interval of time which expires between initial formation of the film and contact with surface 6 by lens blank 14. The film may be in liquid form or in the form of frost. This is determined by the temperature of mold 5, the regulation of which may be varied in accordance with local temperature and humidity conditions to obtain the best results. If the film is in the form of frost, it is converted to moisture when the lens blank surface contacts it.

After the film of moisture is formed on the surface 6 of mold 5, motor 37 drives wheels 38 and 30 which move the lens blank 14 and platen 15 to the left (Fig. 1) through the linkage consisting of shafts 17, 22 and 32. These shafts are proportioned in length to move lens blank 14 into contact with surface 6 of mold 5 and thereafter maintain lens blank 14 in contact with surface 6 for a predetermined period. The lost-motion device 24 provides this predetermined period of contact since spring 26 allows extension 27 of shaft 17 to move into the bore 25 within shaft 22 thereby to take up the excess motion of shaft 22. Thus there is provided a predetermined minimum period of contact between lens blank 14 and surface 6 of mold 5.

The lost-motion device 24 also provides for variation in the length of stroke of shaft 17 which is necessary by reason of the removal of material from the lens blank 14. After each contact between surface 6 and lens blank 14, a certain amount of material is removed from the lens blank thereby requiring that shaft 17 have a longer stroke than was necessary for the previous contact. Shaft 22 is calculated to have a stroke sufficiently long to be slightly in excess of the maximum required to engage blank 14 with surface 6 after the maximum amount of material is dissolved from the blank. During the dissolution process, spring 26 allows shaft 22 to move through the maximum stroke and shaft 17 to move only until blank 14 engages surface 6. Thus it is insured that lens blank 14 will contact surface 6 regardless of the amount of material removed therefrom.

When lens blank 14 moves to the left (Fig. 1) and contacts surface 6, a very thin layer of moisture is deposited on those portions of the lens blank which do not conform to the configuration of surface 6. As the reciprocating mechanism withdraws lens blank 14 to the right, the thin film of moisture on the lens blank dissolves an extremely thin layer of crystalline material from those portions of the lens blank which were contacted by the surface 6. When the lens blank 14 has moved substantially to the rearward extremity of its stroke (shown in Figs. 1 and 2), the film of moisture has become a solution of water and of whatever material the lens blank may consist. At this time cam 50 moves element 47 inwardly to open valve 45 whereby a high-velocity blast of air is emitted from each of the jets 40 and 41. It is intended that this blast of air shall have sufficient velocity literally to blow the moisture from the surface 6 of mold 5 and the surface of lens blank 14, whereby to clean thoroughly these surfaces after each contact.

The foregoing cycle of operation is repeated over and over again at a suitable rate until the entire surface of lens blank 14 conforms to the configuration of surface 6. It has been found by experimentation that it is possible to form lens surfaces in this manner which are accurate to within one-one-hundred-thousandth of an inch.

It is not intended that this invention shall be limited only to controlled dissolution of crystals as the invention is applicable to any soluble optical material. Also, this invention is not limited to the specific details of the embodiment illustrated and described herein. For example, it is not necessary to utilize the specific method and apparatus for cooling mold 5 as it will be obvious to those skilled in the art that numerous other methods of cooling are equally well adapted for use in accordance with this invention. Also, the spacing of jets 40 and 41 with respect to one another and with respect to mold 5 and lens blank 14 is not critical, as these spacings may be varied in numerous ways for obtaining the desired result of cleaning surface 6 and lens blank 14. This invention is also not limited to the specific reciprocating apparatus illustrated and described herein, as any mechanical arrangement for moving lens blank 14 with a reciprocating motion is within the scope of this invention.

It will be obvious from the foregoing description that there are numerous advantages to the method of forming lenses which is provided in accordance with this invention. It is of prime importance in the optical art to form highly accurate lenses. Such lenses have been extremely expensive in the past, but it is found that extremely accurate and high quality lenses may be formed in accordance with this invention in a matter of hours at extremely low cost, whereas prior-art forming methods are very expensive and require considerably longer periods of time. Also, breakage of lens blanks has been reduced to a minimum and no grinding operations are required.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Lens-forming apparatus comprising a mold formed to have the negative configuration of a lens surface, means for forming a film of solvent on said mold, means disposed adjacent said mold and including a member adapted to support and move a lens blank of material soluble in said solvent intermittently into contact with said mold and away from said mold for depositing a thin film of solvent on portions of said lens blank contacted by said mold and means disposed adjacent the surface of said mold and the path of movement of said supporting member for intermittently removing said solvent films from the surfaces of said mold and said lens blank.

2. Lens-forming apparatus comprising a mold formed to have the negative configuration of a lens, means associated with said mold for cooling it to a predetermined temperature and forming a film of solvent on said mold, means disposed adjacent said mold and including a member adapted to support and move a lens blank of soluble material into contact with said mold and away from said mold for repeatedly depositing a thin film of solvent on portions of said lens blank contacted by said mold and means disposed adjacent the surface of said mold and the path of movement of said supporting member and operatively associated with said mechanism for subjecting the surfaces of said mold and said lens blank to high-velocity blasts of gas for bodily removing said films from said surfaces.

3. Lens-forming apparatus comprising a mold formed to have the negative configuration of a lens, means associated with said mold for cooling it to a predetermined temperature and forming a film of solvent on said mold, means disposed adjacent said mold and including a member adapted to support and move a lens blank of soluble material into contact with said mold and away from said mold for repeatedly depositing a thin film of solvent on portions of said lens blank contacted by said mold, a source of gas under a pressure several times atmospheric pressure disposed adjacent the surface of said mold and the path of movement of said supporting member and valve means operatively associated with said mechanism and said source of gas for subjecting the surfaces of said mold and said lens blank to high-velocity blasts of gas for bodily removing said solvent films from said surfaces.

4. Lens-forming apparatus comprising a mold formed to have the negative configuration of a lens, cooling means associated with said mold for cooling it to a predetermined temperature, a source of solvent-laden air disposed adjacent the surface of said mold for surrounding it with a cloud of solvent-laden air and forming a film of solvent on said mold, means disposed adjacent said mold and including a member adapted to support and move a lens blank of soluble material into contact with said mold and away from said mold for repeatedly depositing a thin film of solvent on portions of said lens blank contacted by said mold, a source of gas under a pressure several times atmospheric pressure disposed adjacent the surface of said mold and the path of movement of said supporting member and valve means operatively associated with said mechanism and said source of gas for subjecting the surfaces of said mold and said lens blank to high-velocity blasts of gas for bodily removing said solvent films from said surfaces.

5. Lens-forming apparatus comprising a mold formed to have the negative configuration of a lens, cooling means associated with said mold for cooling it to a predetermined temperature, a source of moisture-laden air disposed adjacent the surface of said mold for surrounding it with a cloud of moisture-laden air and forming a film of moisture on said mold, means disposed adjacent said mold and including a member adapted to support and move a lens blank of soluble material into contact with said mold and away from said mold for repeatedly depositing a thin film of moisture on portions of said lens blank contacted by said mold, a source of air under a pressure several times atmospheric pressure disposed adjacent the surface of said mold and the path of movement of said supporting member and valve means operatively associated with said mechanism and said source of air for subjecting the surfaces of said mold and said lens blank to high-velocity blasts of air for bodily removing said moisture films from said surfaces.

6. Lens-forming apparatus comprising a mold formed to have the negative configuration of a lens, cooling means associated with said mold for cooling it to a predetermined temperature, a source of moisture-laden air disposed adjacent the surface of said mold for surrounding it with a cloud of moisture-laden air and forming a film of moisture on said mold, reciprocable mechanism disposed adjacent said mold and including a member adapted to support and move a lens blank of soluble material into contact with said mold and away from said mold for repeatedly depositing a thin film of moisture on portions of said lens blank contacted by said mold, a source of air under a pressure several times atmospheric pressure disposed adjacent the surface of said mold and the path of movement of said supporting member and valve means operatively associated with said mechanism and said source of air for subjecting the surfaces of said mold and said lens blank to high-velocity blasts of air for bodily removing said moisture films from said surfaces.

7. Lens-forming apparatus comprising a mold formed to have the negative configuration of a lens, cooling means associated with said mold for cooling it to a predetermined temperature, a source of moisture-laden air disposed adjacent the surface of said mold for surrounding it with a cloud of moisture-laden air and forming a film of moisture on said mold, reciprocable mechanism disposed adjacent said mold and including a member adapted to support and move a lens blank of soluble material into contact with said mold and away from said mold for repeatedly depositing a thin film of moisture on portions of said lens blank contacted by said mold, a normally inactive source of air under a pressure several times atmospheric pressure disposed adjacent the surface of said mold and the path of movement of said supporting member and valve means operatively associated with said mechanism for rendering said source of air effective whereby to subject the surfaces of said mold and said lens blank to high-velocity blasts of air for bodily removing said moisture films from said surfaces.

8. Lens-forming apparatus comprising a mold formed to have the negative configuration of a lens, cooling means associated with said mold for cooling it to a predetermined temperature, a source of moisture-laden air disposed adjacent the surface of said mold for surrounding it with a cloud of moisture-laden air and forming a film of moisture on said mold, reciprocable mechanism disposed adjacent said mold and including a member adapted to support and move a lens blank of soluble material into contact with said mold and away from said mold for repeatedly depositing a thin film of moisture on portions of said lens blank contacted by said mold, a source of air under a pressure several times atmospheric pressure including tubes terminating adjacent the surface of said mold and the path of movement of said supporting member and valve means operatively associated with said mechanism for admitting air to said tubes whereby to subject the surfaces of said mold and said lens blank to high-velocity blasts of air for bodily removing said moisture films from said surfaces.

9. Lens-forming apparatus comprising a mold formed to have the negative configuration of a lens, cooling means associated with said mold for cooling it to a predetermined temperature, a source of moisture-laden air including a jet disposed adjacent the surface of said mold for surrounding it with a cloud of moisture-laden air and forming a film of moisture on said mold, reciprocable mechanism disposed adjacent said mold and including a member adapted to support and move a lens blank of soluble material into contact with said mold and away from said mold for repeatedly depositing a thin film of moisture on portions of said lens blank contacted by said mold, a source of air under a pressure several times atmospheric pressure including jets disposed adjacent the surface of said mold and the path of movement of said supporting member and valve means operatively associated with said mechanism for admitting air to said jets whereby to subject the surfaces of said mold and said lens blank to high-velocity blasts of air for bodily removing said moisture films from said surfaces.

10. A method of forming lenses of soluble materials comprising the steps of periodically forming a film of a solvent of said materials on the surface of a mold, periodically establishing contact between the film of solvent and portions of a lens blank of said materials which do not conform to the configuration of said mold surface and periodically removing said solvent from said surface and from said portions.

11. A method of forming lenses from soluble materials comprising the steps of surrounding the surface of a mold with a cloud of solvent-laden gas to form a film of solvent on said surface, repeatedly establishing contact between said film of solvent and portions of said lens blank, and periodically removing said solvent films from said surfaces.

12. A method of forming lenses from soluble materials comprising the steps of surrounding the surface of a mold with a cloud of solvent-laden gas to form a film of solvent on said surface, moving a lens blank into contact with said mold and away from said mold to repeatedly deposit a thin film of solvent on portions of said lens blank contacted by said mold, and periodically subjecting the surfaces of said mold and said lens blank to high-velocity blasts of gas to remove said solvent films from said surfaces.

13. A method of forming lenses from soluble crystals comprising the steps of surrounding the surface of a mold with a cloud of moisture-laden air to form a film of moisture on said surface, moving a lens blank into contact with said mold and away from said mold to repeatedly deposit a thin film of moisture on portions of said lens blank contacted by said mold, and periodically subjecting the surfaces of said mold and said lens blank to high-velocity blasts of air to remove said moisture films from said surfaces.

14. A method of forming lenses from soluble crystals comprising the steps of cooling to a predetermined temperature a surface of a mold, surrounding said surface with a cloud of moisture-laden air to form a film of moisture on said surface, moving a lens blank into contact with said mold and away from said mold to repeatedly deposit a thin film of moisture on portions of said lens blank contacted by said mold, and periodically subjecting the surfaces of said mold and said lens blank to high-velocity blasts of air to remove said moisture films from said surfaces.

15. Lens-forming apparatus comprising, a mold formed to have the negative configuration of a lens surface, means for intermittently forming a film of solvent on said mold, means including members for supporting said mold and a lens blank of material soluble in said solvent, said members being relatively movable for establishing intermittently contact between said lens blank and said film of solvent and means disposed adjacent said mold and said lens blank for intermittently removing said film of solvent from the surface of the mold and the surface of the lens blank.

FRANÇOIS C. P. HENROTEAU.
SANFORD S. ULRICH.

REFERENCES CITED

The following references are of record in the file of this patent:

UNITED STATES PATENTS

| Number | Name | Date |
|---|---|---|
| 2,328,533 | Walker | Aug. 31, 1943 |
| 2,372,535 | Walker | Mar. 27, 1945 |
| 2,384,638 | Penberthy | Sept. 11, 1945 |